(12) United States Patent
Dietz

(10) Patent No.: US 6,591,068 B1
(45) Date of Patent: Jul. 8, 2003

(54) METHOD AND APPARATUS FOR AUTOMATIC IMAGE CAPTURE

(75) Inventor: Paul H. Dietz, Hopkinton, MA (US)

(73) Assignee: Disney Enterprises, Inc, Burbank, CA (US)

( * ) Notice: Subject to any disclaimer, the term of this patent is extended or adjusted under 35 U.S.C. 154(b) by 0 days.

(21) Appl. No.: 09/690,324

(22) Filed: Oct. 16, 2000

(51) Int. Cl.⁷ .................. G03B 29/00; G03B 17/48; H04N 9/47

(52) U.S. Cl. ............ 396/429; 348/64; 358/909.1; 396/56

(58) Field of Search ............ 396/56, 57, 310, 396/311, 429, 430, 322; 386/46, 116, 117, 120, 124; 348/61, 64, 36, 159; 700/90; 725/1–8; 358/906, 909.1

(56) References Cited

U.S. PATENT DOCUMENTS

| | | | |
|---|---|---|---|
| 4,567,532 A | 1/1986 | Baer et al. | 386/117 |
| 5,508,737 A | 4/1996 | Lang | 348/159 |
| 5,576,838 A | 11/1996 | Renie | 386/117 |
| 5,594,935 A | 1/1997 | Reber et al. | 725/2 |
| 5,598,208 A | 1/1997 | McClintock | 348/159 |
| 5,655,053 A | 8/1997 | Renie | 386/117 |
| 5,666,215 A | 9/1997 | Fredlund et al. | 358/487 |
| 5,694,514 A | 12/1997 | Evans et al. | 386/46 |
| 5,751,885 A | 5/1998 | O'Loughlin et al. | 386/46 |
| 5,844,797 A | 12/1998 | Johnson | 700/90 |
| 5,872,887 A | 2/1999 | Walker | 386/117 |

Primary Examiner—Russell Adams
Assistant Examiner—Rochelle Blackman
(74) Attorney, Agent, or Firm—The Hecker Law Group

(57) ABSTRACT

The present invention provides an automatic picture taking system at a theme park. The system is passive, with guests photographed automatically from a plurality of cameras distributed throughout the theme park. When a picture is taken, the camera broadcasts a code signal that is associated with that picture or image. A code receiver carried or worn by the guest receives the code and stores it in a memory associated with the receiver. The system assumes that any guest that receives the code must have been in the picture when it was taken. At any time, a guest may elect to review the pictures taken so far of the guest by visiting a location for that purpose. When the pictures are taken digitally, for example, the pictures can be provided by a central server to any of a number of locations. The guest may elect to purchase some or all of the pictures that include the guest. In one embodiment, the images are photographs, while in others the images may be videos or a combination of photographs and videos.

9 Claims, 3 Drawing Sheets

METHOD AND APPARATUS FOR AUTOMATIC IMAGE CAPTURE

BACKGROUND OF THE INVENTION

1. Field of the Invention

This invention relates to the field of automatically capturing images.

Portions of the disclosure of this patent document contain material that is subject to copyright protection. The copyright owner has no objection to the facsimile reproduction by anyone of the patent document or the patent disclosure as it appears in the Patent and Trademark Office file or records, but otherwise reserves all copyright rights whatsoever.

2. Background Art

It can be an enjoyable and rewarding experience for a person to look at photographs or other media records of places visited or trips taken. However, it can also be a frustrating experience to acquire, maintain transport, and use all of the equipment necessary to obtain the photographs. In addition, the taking of the photographs themselves is an interruption of the travel experience itself. Some of the problems associated with creating a media record of events can be seen in an example of visiting a theme park.

Theme park guests often enjoy recording their experience with photographs, videos, or other media records. But there are a number of problems associated with making such records. First of all is the burden of carrying cameras or other media recording equipment during the visit. To make sure the cameras are available whenever an appropriate opportunity arises, the theme park guest must carry the camera the entire time. Even with straps or bags, it is inconvenient to always have the camera at hand. Smaller cameras may be easier to carry but fail to provide adequate pictures.

Another problem is that the guest may not have the opportunity to appear in their own pictures. If the guest is alone, or even with a group, the person taking the picture can't easily appear in the picture (absent using a timer and leaving the camera unprotected). An image record without the guest in the images is not the best type of record. It may be possible to ask strangers to take pictures. However, such strangers may not be good photographers, may not know how to optimize the pictures, and worse, may actually run off with expensive equipment.

Even when a guest is willing to put up with the inconvenience of carrying their own media recording equipment, the resulting images rarely turn out the way the guests intend. Amateur photographers produce amateur images. The resulting images may lack the style and polish of professionally taken images, or images taken with higher quality equipment. Further, some of the most desirable pictures may be impossible for a guest to obtain. On certain attractions, for example, the guest may not be able to have a photograph taken while the guest is on the attraction. When the guest is on a roller coaster, for example, it is not practical for another rider to take pictures during the roller coaster ride.

There have been some attempts to provide solutions to the task of image capture at theme parks. On some attractions a theme park maintained camera takes pictures of all participants at one or more locations on the attraction. After exiting the attraction, a guest searches for their picture from a plurality of displayed images and determines whether to purchase a hard copy or not. A disadvantage of this system is that it is limited in scope, being only in place in a certain number of attractions. Another disadvantage is that the guest must elect to obtain the pictures at each attraction and so is often left carrying a number of images with them during the remainder of their visit at the theme park. As some attractions often involve water, the potential for damaging such images creates further problems.

SUMMARY OF THE INVENTION

The present invention provides an automatic picture taking system at a theme park. The system is mostly passive, with guests photographed automatically from a plurality of cameras distributed throughout the theme park. When a picture is taken, the camera broadcasts a code signal that is associated with that picture or image. A code receiver carried or worn by the guest receives the code and stores it in a memory associated with the receiver. Since the code broadcast area is suitably arranged to match the area being photographed by a particular camera, then any guest that receives the code must have been in the picture when it was taken. At any time, a guest may elect to review the pictures taken so far of the guest by visiting a location for that purpose. When the pictures are taken digitally, for example, the pictures can be provided by a central server to any of a number of locations. The guest may elect to purchase some or all of the pictures that include the guest. In one embodiment, the images are photographs, while in others the images may be videos or a combination of photographs and videos.

The cameras can be either hidden or conspicuous so as to allow candid or posed shots. In the latter case, obvious mechanisms can be used to indicate precisely when the picture is being taken (e.g. a countdown timer, a flash, etc.). It is possible to arrange the camera such that the user actively triggers the taking of the picture. It is also possible to use cameras carried by photographers roaming throughout the park. The roving photographers have a camera that also associates a captured image with a code number and transmits that code number when the image is taken. Those guests with code receivers in the field of the camera will receive the code number even if they are not aware that they are in a picture. This allows the roving photographer to obtain candid and posed pictures. The codes and images could be wirelessly transmitted to a server or could be manually downloaded periodically by the roving photographer.

The present invention utilizes an infrared identification scheme to associate a guest with a particular image. The camera outputs a serial number associated with the particular image taken and transmits that serial number via infrared. Only the guests having code receivers in the area of the transmitted infrared signal receive the associated serial number. Later, the guest can submit the code receiver for retrieval of the serial numbers of all images taken of that guest that day. The images can then be collected and offered to the guest in some presentation format.

The images of the guest can be provided in hard copy format or in digital form. In addition to recording picture serial numbers, the wearable guest devices can also record other location data from additional infrared data transmitters located throughout the park. This allows the creation of detailed maps that document the guest's journey through the park that day. For guests who are traveling as a group, the data from multiple devices can be merged to created a single, coherent record of the group's visit. In another embodiment, the photo album can be delivered in the form of a personal web site on the Internet.

Although the system has been described in terms of still images, it can also be used with any other form of electronic sensing. For example, audio, video, temperature readings, etc. can be collected and indexed via the same sort of code signal. This will allow for full multimedia record of the visit.

DETAILED DESCRIPTION OF THE INVENTION

The invention is a method and apparatus for automatically creating a record of a visit to suitably arranged site. In the following description, numerous specific details are set forth to provide a more thorough description of embodiments of the invention. It will be apparent, however, to one skilled in the art, that the invention may be practiced without these specific details. In other instances, well known features have not been described in detail so as not to obscure the invention.

The present invention provides a system of automatic image capture, such as at a theme park. Networked, digital cameras are installed throughout the park. These cameras can be either regularly self-triggered or triggered by a guest. In either case, the cameras record the picture in an image database and transmit an image identifying serial number via an infrared signal. A device that is worn by the guest records this signal. Through careful arrangement, the wearable guest device only receives the serial number if the guest is in that picture. At the end of the visit, the guest returns the device to a service area where the data (i.e. the serial numbers) are downloaded into a computer, which then retrieves the appropriate pictures from the image database. An electronic photo album is instantly created, which can be edited, printed, and/or electronically transferred to the guest.

Guest Code receiver

Figure 1:
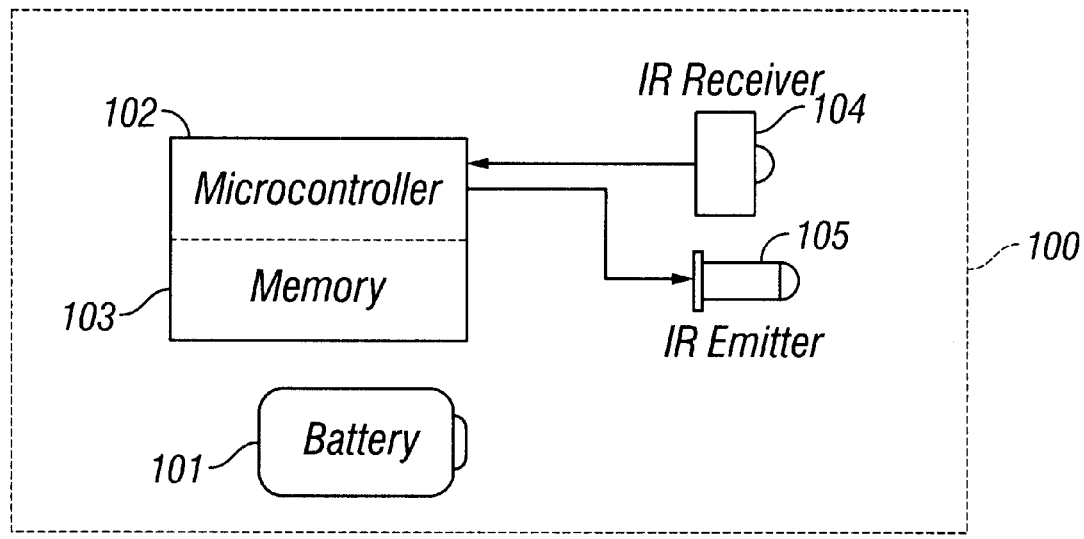
FIG. 1 illustrates a block diagram of a code receiver used in one embodiment of the invention.

One embodiment of the present invention contemplates an infrared transmitter/receiver for use as the code receiver in the image capture scheme. A block diagram of an infrared code receiver that could be carried or worn by a guest is illustrated in FIG. 1. The code receiver 100 comprises a power source, such as battery 101, a microcontroller 102, memory 103 (which may be integrated on a processor), an infrared receiver module 104 and an infrared emitter 105. In an alternate embodiment, the power source could be a solar power system.

In operation, the system searches for incoming IR serial data. When IR data is received, it is checked for validity. When a valid data packet is received, it is stored in the memory 103 in a compressed or uncompressed format. The packets may originate from infrared location transmitters (as described in pending U. S. patent application Ser. No. 09/547,931, entitled "Location-Sensitive Toy and Method Therefor," assigned to the assignee of the present application, and incorporated herein by reference), or from a camera's infrared transmitter. In addition to data packets, the device also recognizes control signals that can clear or retrieve the data stored in memory. The data is transmitted out of the unit via a small IR emitter. Alternatively, a data port may be incorporated for hard wire transfer.

The code receiver can be made relatively inexpensively and can be made quite small. The code receiver can be worn or carried by the guest in any one of many ways, including as a pendant, built into a hat, or as a pin.

Image Capture Infrastructure

Figure 2:
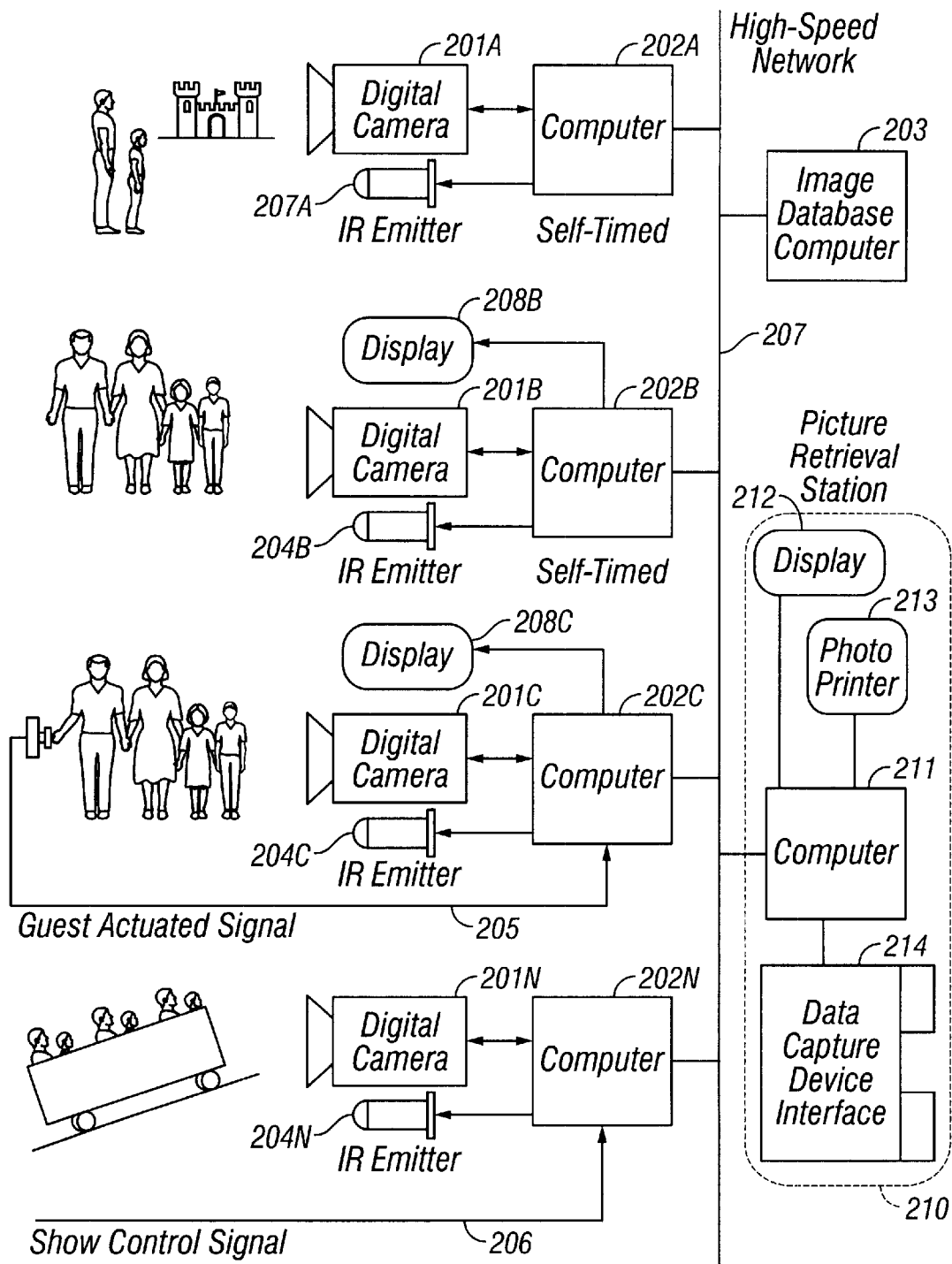
FIG. 2 is a block diagram of one embodiment of the system of the present invention.

A block diagram of an infrastructure system for implementing an embodiment of the present invention is illustrated in FIG. 2. A plurality of digital cameras 201A through 201N are distributed throughout a theme park. Each digital camera is connected to a computer 202A through 202N respectively that captures image data, optionally compresses it, and then transmits it via a network 207 to an Image Database Computer 203. In addition, each local computer 202A through 202N generates a serialized code corresponding to the location and the particular image captured. This code is transmitted via an IR emitter (such as emitters 204A through 204N respectively) to the area that was just photographed by the camera. (For example, if the camera is facing in one direction when the picture is taken, the code is transmitted in that direction.) This code is recorded by the guest code receivers that are in the area. The presumption is that any guest that can receive the transmitted code must have been in the image that was just captured. In this manner, there is no need for the guest to even realize that a picture has been taken. Any guest in the picture will probably have the code of that image stored in his or her code receiver for later processing.

Camera Triggering

The digital cameras can be triggered in any one of a plurality of ways, some of which can be described in connection with FIG. 2. Referring to camera 201 A, for example, the camera may be silently self-triggered, taking pictures automatically at regular intervals. Such an arrangement is useful for obtaining unposed, candid shots. When the camera automatically activates, a corresponding code is transmitted via IR emitter 204A to any code receiver in the range and direction of the camera, so that a guest can later be informed that the guest appears in that image. As can be understood from such a system, an image may contain any number of guests, including guests who have no relationship to one another. However, guests receiving the code will be informed that the image includes them for later viewing and optional purchase.

Turning now to camera 201B, the camera is still self-triggered, but is arranged to encourage carefully posed photographs. Appropriate signage indicates proper places to stand, while a display 208B counts down to when the next image will be captured. This system permits guests to pose for an image, and perhaps to have only related guests in the image. In one embodiment, the display 208B also displays the image that the camera is seeing so that appropriate adjustments can be made by the guests to insure the most desirable image is produced. When the countdown indicates that an image has been captured, the IR emitter 204B transmits an associated code to the code receiver(s) of the guest or guests that are posing for the image.

Camera 201C provides another method of capturing images. As with camera 201B, guests are informed of an appropriate location to pose for an image. However, instead of a countdown to image capture, the guest can activate the image capture by activating a switch that transmits a signal 205 (via wire or wirelessly) to computer 202C. The guests can see themselves posing on display 208C and can activate the camera 201C when the pose is optimal. IR emitter 204C transmits the appropriate code for storage in the guests code receiver.

Camera 201N illustrates another method of image capture. While on a theme park attraction, a show control signal 206 that indicates that guests are in an appropriate location is transmitted to computer 202N. This triggers an image capture and the associated transmission of a code from IR emitter 204N to code receivers worn by the guests. This permits guests to obtain images that would be impossible for the guest to otherwise obtain. Cameras can be placed safely at multiple locations of an attraction where a guest would not be permitted to stand to take pictures.

The cameras may be in fixed locations as noted above or may be carried and activated by photographers. The roving photographers have a still or video camera that also associates a captured image with a code number and transmits that code number when the image is taken. Those guests with code receivers in the field of the camera will receive the code number even if they are not aware that they are in a picture. This allows the roving photographer to obtain candid and posed pictures. The codes and images could be wirelessly transmitted to a server or could be manually downloaded periodically by the roving photographer.

In addition to the methods described above, any other suitable scheme for triggering the cameras may be used with the present invention. For example, instead of a timer-based camera, there may be a motion detector or proximity detector that is used to provide a control signal to trigger a camera. Thus, whenever a guest passes by a certain location an appropriate camera will be triggered to capture an image and transmit the code signal. In other embodiments, the code receiver itself may transmit a signal that, when detected by a camera sensor, causes the camera to capture an image.

A particularly elegant method of allowing a guest to initiate an image capture is to have the guest wave at the camera. The wave can easily be detected via a Doppler Ultrasound System (as described in pending U.S. patent Ser. No. 09/261,654, entitled "Apparatus For Detecting Guest Interactions And Method Therefor," assigned to the assignee of the present application, and incorporated herein by reference), or other suitable motion sensor.

Each camera contains a location code in the transmitted code signal to identify the location of the camera. In addition, a time stamp can be included in the transmitted code. In this manner, a mapping of the guests travel through the theme park may be made. This data can be used to generate a custom presentation of the images captured for a particular guest, such as by putting together a scrapbook with stock images from the areas visited by the guest and arranged in the order in which the guest visited different areas of the park.

Figure 3:
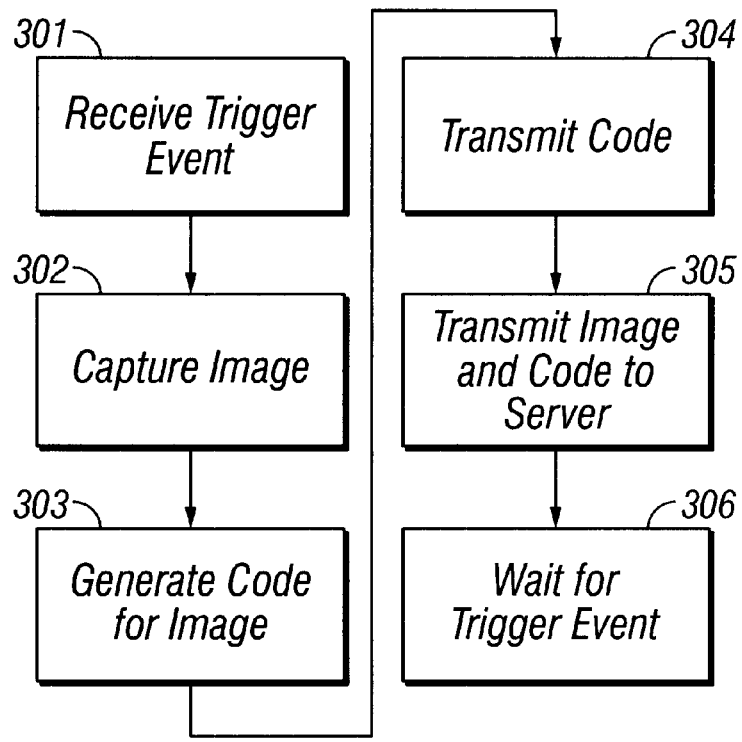
FIG. 3 is a flow diagram illustrating the operation of a camera in one embodiment of the present invention.

FIG. 3 is a flow diagram illustrating the operation of a camera in one embodiment of the present invention. At step 301, the camera receives the trigger event. This could be, as noted above, a time based trigger, a guest activated trigger, an attraction activated trigger, a motion or sensor activated trigger, or any other suitable event. At step 302, the camera captures an image. (Note that the image could be still or video). At step 303 the camera generates a code value for associating with the image. At step 304 the camera transmits the code via its IR transmitter. At step 305 the camera transmits the image and its associated code to the image server. At step 306, the camera waits for the next triggering event.

The code that is associated with the image capture can be generated in any of a plurality of ways. Each camera should have a unique location identifier associated with the camera. The image code could be the location identifier combined with a time stamp to create a unique value for each captured image. Any other suitable code generating scheme can be utilized as long is it makes it possible to specify which images are to be associated with a particular code value.

It is sometimes desirable to give a guest the ability to control picture taking directly via the code receiver which they are carrying. This can be accomplished via either active or passive methods. In the active case, a special transmitter is added to the code receiver which triggers the image capture via a suitable receiver near the camera. This transmitter could use IR, RF, or other suitable technology. The transmitter is activated when the guest pushes a button on the code receiver. A visual and/or audible signal can provide feedback to the guest that a picture was successfully taken. This feedback can originate from the camera and/or the code receiver. Vibration or some other tactile means could also be used for this purpose.

It is also possible to achieve a similar effect with a passive system. In this case, a button is added to the code receiver which allows the user to indicate their desire for an image capture. The button press event is recorded in the device, which allows the retrieval system to provide images taken temporally near that event. This provides the illusion that the guest is activating the image capture. The code receiver can still provide feedback as described previously to indicate a successful image capture.

Viewing and Retrieving Images

When guests have completed their visit to the park, or at any time they desire, the guests bring their code receivers to a Picture Retrieval Station 210 such as shown in FIG. 2. Because the images are captured digitally, there may be a plurality of Picture Retrieval Stations located throughout the theme park. This obviates the bottlenecking of all guests at a single location at the end of the day or at closing time. The guest places the code receiver near the Data Capture Device Interface 214. A link (such as a wireless IR link) is created through computer 211 and network 207 to download the codes from the code receiver. The Picture Retrieval Station Computer 211 uses this data to access the appropriate images from the image database computer 203, and displays the images (such as thumbnail images) on display 212. The guest can choose to view full size, edit, or print with photographic quality (via printer 213) any of the images for a fee. If desired, an entire photo album can be created in one of many styles, including maps of the day's journey annotated with appropriate pictures such as optional stock images included from specific theme park areas and attractions. In one alternate embodiment, the guest can receive the images as digital data, such as on a disk or memory card, with or without additional stock images and mapping data. In another embodiment, the guest can elect to have a custom web page constructed that can be accessed by friends and family via the Internet for easy distribution of theme park images.

As noted previously, images may include still photographic images or moving video images, or a mix of the two.

In one embodiment, groups of people (such as families) will wish to share a single photo album. This can be accomplished by giving each member of the group their own code receiver and then merging the resulting data at the Picture Retrieval Station 210. For the purposes of drawing a coherent map of the visit, the software is able to recognize reasonable proximity as a single group path, while allowing significant divergence to appear as sub-group or even individual paths.

It should be noted that there is substantial opportunity for automatic electronic enhancement of the images after they have been recorded. Difficult lighting situations inside attractions can be compensated for, even to the point of editing in known backgrounds. Despite gray skies, every day can appear bright and sunny.

Figure 4:
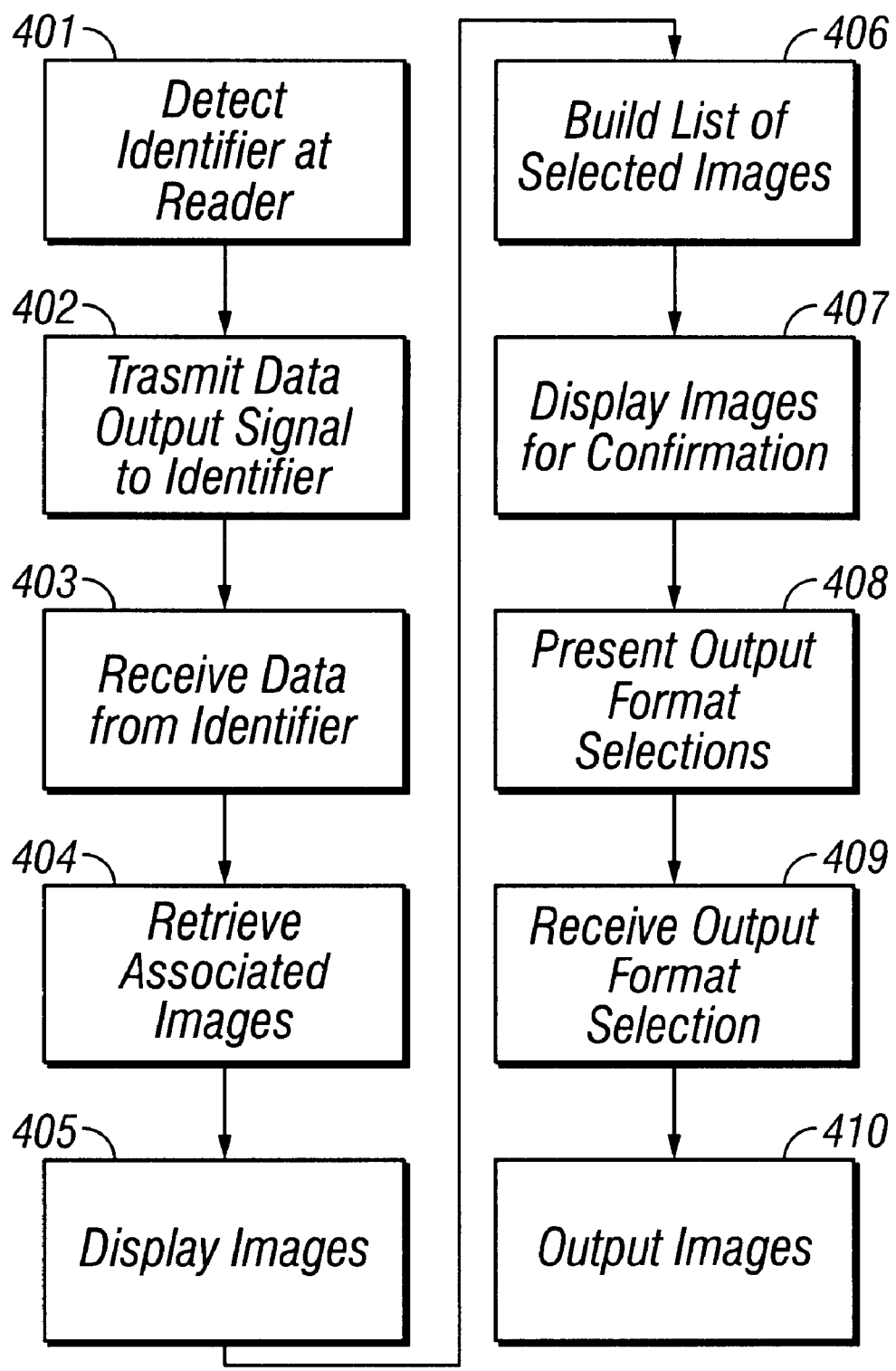
FIG. 4 is a flow diagram illustrating the operation of the retrieval system of on embodiment of the invention.

FIG. 4 is a flow diagram illustrating the operation of one embodiment of the picture retrieval scheme of the invention. At step 401 the system detects a code receiver at the reader port. At step 402 the system transmits a signal to the code receiver to cause it to output its data, namely the code signals received by the code receiver and stored in the code receiver memory.

At step 403 the system receives the list of code values from the code receiver. At step 404 the system retrieves the associated images from the image server and displays them at step 405. The display may be of thumbnails of the images or it may be a series of larger size images from which the guest can select some or all. As the guest selects images the system builds a list of selected images at step 406. At step 407 the system displays the selected images for confirmation. After confirmation the system presents the guest with output format options at step 408. These options include prints of the images, a video tape, a scrapbook format, an electronic copy, or a web page. The guest selects the output format and the system receives that selection at step 409. At step 410 the system outputs the images into the selected output format.

In one or more embodiments of the present invention, guests without a code receiver are allowed to obtain photographs. An image capture kiosk which is used for guest activated (such as by waving as described previously), posed photographs can also be suitably configured to allow guests to purchase current photographs by inserting credit cards or similar payment means. The kiosk could either contain a printer which delivers photographs on the spot, or it could provide receipts for later pick-up or delivery elsewhere.

Guests are used to having pictures and videos include a time stamp indicating when the images were acquired. A similar functionality can be achieved with the present invention by various means.

In one embodiment, the code receiver does the time stamping. With the addition of a real time clock on board, each code received (or user action such as pressing a button) can be annotated with the time of the event. This clock may or may not have a display on the device. With a display, the clock could be set either by the guest, or via IR transmission or similar data link. Without a display, the data link would be the most practical.

In another embodiment of this invention, the infrastructure can include a clock, and the time can be transmitted via infrared along with the location codes and image identification numbers.

Thus, a method and apparatus for automatic image capture has been described.

What is claimed is:

1. An image capture system comprising:
   at least one camera;
   a triggering mechanism to cause said at least one camera to generate a captured image;
   a code generator coupled to said at least one camera for generating a code associated with said captured image;
   a first transmitter on said at least one camera for transmitting said code; and,
   a code receiver carried by a guest, wherein said code receiver comprises a processor, a memory, a receiver, and a second transmitter, and wherein said code receiver is configured to associate said captured image with said guest by receiving said code when said code receiver is in proximity to said camera that generates said captured image.

2. An image capture system comprising:
   at least one camera;
   a triggering mechanism to cause said at least one camera to generate a captured image;
   a code generator coupled to said at least one camera for generating a code associated with said captured image;
   a first transmitter on said at least one camera for transmitting said code; and,
   a code receiver carried by a guest, wherein said code receiver comprises a processor, a memory, a receiver, and a second transmitter, and wherein said code receiver comprises an infrared receiver and is configured to associate said captured image with said guest by receiving said code when said code receiver is in proximity to said camera that generates said captured image.

3. An image capture system comprising:
   at least one camera;
   a triggering mechanism to cause said at least one camera to generate a captured image;
   a code generator coupled to said at least one camera for generating a code associated with said captured image, wherein said at least one camera emits an infrared signal to transmit said code;
   a first transmitter on said at least one camera for transmitting said code; and,
   a code receiver carried by a guest, wherein said code receiver comprises a processor, a memory, a receiver, and a second transmitter, and wherein said code receiver comprises an infrared receiver and is configured to associate said captured image with said guest by receiving said -code when said code receiver is in proximity to said camera that generates said captured image.

4. An image capture system comprising:
   at least one camera;
   a triggering mechanism to cause said at least one camera to generate a captured image;
   a code generator coupled to said at least one camera for generating a code associated with said captured image, wherein said at least one camera emits an infrared signal to transmit said code, and wherein said at least one camera emits a plurality of unique codes when a plurality of images are captured;
   a first transmitter on said at least one camera for transmitting said code; and,
   a code receiver carried by a guest, wherein said code receiver comprises a processor, a memory, a receiver, and a second transmitter, and wherein said code receiver comprises an infrared receiver and is configured to associate said captured image with said guest by receiving said code when said code receiver is in proximity to said camera that generates said captured image.

5. An image capture system comprising:
   at least one camera;
   a triggering mechanism to cause said at least one camera to generate a captured image;
   a code generator coupled to said at least one camera for generating a code associated with said captured image, wherein said at least one camera emits an infrared signal to transmit said code, and wherein said at least one camera emits a plurality of unique codes when a plurality of images are captured;

a first transmitter on said at least one camera for transmitting said code; and, a code receiver carried by a guest, wherein said code receiver comprises a processor, a memory, a receiver, and a second transmitter, and wherein said code receiver comprises an infrared receiver, said code receiver stores said plurality of unique codes in said memory, and is configured to associate said captured image with said guest by receiving said code when said code receiver is in proximity to said camera that generates said captured image.

6. An image capture system comprising:

at least one camera;

a triggering mechanism to cause said at least one camera to generate a captured image;

a code generator coupled to said at least one camera for generating a code associated with said captured image, wherein said at least one camera emits a plurality of unique codes when a plurality of images are captured;

a first transmitter on said at least one camera for transmitting said code; and, a code receiver carried by a guest, wherein said code receiver comprises a processor, a memory, a receiver, and a second transmitter, wherein said code receiver stores said plurality of unique codes in said memory and wherein said code receiver is configured to associate said captured image with said guest by receiving said code when said code receiver is in proximity to said camera that generates said captured image.

7. An image capture system comprising:

at least one camera;

a triggering mechanism to cause said at least one camera to generate a captured image;

a code generator coupled to said at least one camera for generating a code associated with said captured image;

a first transmitter on said at least one camera for transmitting said code;

a code receiver carried by a guest, wherein said code receiver comprises a processor, a memory, a receiver, and a second transmitter, said receiver comprises at least one wireless receiver and wherein said second transmitter comprises at least one wireless transmitter, said triggering mechanism comprises a push button on said code receiver and wherein said code receiver is configured to associate said captured image with said guest by receiving said code when said code receiver is in proximity to said camera that generates said captured image; and an indicator for alerting said guest.when said at least one camera captures said captured image, wherein said at least one camera generates said captured image when said push button is depressed.

8. A method of capturing an image comprising:

triggering at least one camera to generate a captured image;

generating a code associated with said captured image, wherein said at least one camera emits a plurality of unique codes when a plurality of images are captured;

transmitting said code; and, receiving said code in a code receiver carried by a guest, wherein said code receiver comprises a processor, a memory, a receiver, and a transmitter, wherein said code receiver stores said plurality of unique codes in said memory and wherein said code receiver is configured to associate said captured image with said guest by receiving said code when said code receiver is in proximity to said at least one camera that generates said captured image.

9. A method of capturing an image comprising:

triggering at least one camera to generate a captured image;

generating a code associated with said captured image, wherein said at least one camera emits a plurality of unique codes when a plurality of images are captured;

transmitting said code wherein said at least one camera emits an infrared signal to transmit said code; and, receiving said code in a code receiver carried by a guest, wherein said code receiver comprises a processor, a memory, a receiver, and a transmitter, wherein said code receiver stores said plurality of unique codes in said memory, said code receiver comprises an infrared receiver and an infrared transmitter and wherein said code receiver is configured to associate said captured image with said guest by receiving said code when said code receiver is in proximity to said at least one camera that generates said captured image.

* * * * *